United States Patent

Iwai

(10) Patent No.: US 9,108,522 B2
(45) Date of Patent: Aug. 18, 2015

(54) VEHICLE-MOUNTED CONTROLLER

(71) Applicant: Atsushi Iwai, Tajimi (JP)

(72) Inventor: Atsushi Iwai, Tajimi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 212 days.

(21) Appl. No.: 14/018,845

(22) Filed: Sep. 5, 2013

(65) Prior Publication Data

US 2014/0070759 A1 Mar. 13, 2014

(30) Foreign Application Priority Data

Sep. 12, 2012 (JP) ................. 2012-200185

(51) Int. Cl.
*H02J 7/00* (2006.01)
*B60L 11/18* (2006.01)

(52) U.S. Cl.
CPC ......... *B60L 11/1811* (2013.01); *B60L 11/1838* (2013.01); *B60L 11/1868* (2013.01); *Y02T 10/7005* (2013.01); *Y02T 10/7066* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC .............. Y02T 10/7066; Y02T 10/642; Y02T 10/7055; Y02T 90/128
USPC ....................................................... 320/104
See application file for complete search history.

(56) References Cited

U.S. PATENT DOCUMENTS

| | | | |
|---|---|---|---|
| 6,281,660 B1 * | 8/2001 | Abe | 320/103 |
| 2010/0120581 A1 * | 5/2010 | Mitsutani et al. | 477/7 |
| 2012/0074903 A1 | 3/2012 | Nakashima | |
| 2012/0299377 A1 * | 11/2012 | Masuda et al. | 307/10.1 |
| 2013/0162208 A1 * | 6/2013 | Ohnuki | 320/109 |

FOREIGN PATENT DOCUMENTS

| | | |
|---|---|---|
| JP | 2004-254059 A | 9/2004 |
| JP | 2010-288317 A | 12/2010 |
| JP | 2011-894 A | 1/2011 |
| JP | 2012-110155 A | 6/2012 |

* cited by examiner

*Primary Examiner* — Suchin Parihar
(74) *Attorney, Agent, or Firm* — Sughrue Mion, PLLC

(57) ABSTRACT

A vehicle-mounted controller mounted on a vehicle includes communication state determination unit and a battery charging control unit. The communication state determination unit is configured to determine whether or not vehicle-mounted information equipment performs communication with external charging equipment or an external information device via a charging cable. The battery charging control unit is configured to control, in a case where the communication state determination unit determines that the vehicle-mounted information equipment performs the communication with the external charging equipment or the external information device via the charging cable, a voltage converter so as to charge a low-voltage battery by supplying electric power from a high-voltage battery to the low-voltage battery when a first specific time has elapsed since start of the communication. The high-voltage battery, the vehicle-mounted information equipment, the low-voltage battery, and the voltage converter are provided with the vehicle.

8 Claims, 2 Drawing Sheets

VEHICLE-MOUNTED CONTROLLER

INCORPORATION BY REFERENCE

The disclosure of Japanese Patent Application No. 2012-200185 filed on Sep. 12, 2012 including the specification, drawings and abstract is incorporated herein by reference in its entirety.

BACKGROUND OF THE INVENTION

1. Field of the Invention

The invention relates to a vehicle-mounted controller mounted on a vehicle having a high-voltage battery, vehicle-mounted information equipment, a low-voltage battery, and a voltage converter that performs voltage conversion between the high-voltage battery and the low-voltage battery.

2. Description of Related Art

Conventionally, a vehicle-mounted controller that uses a high-voltage electric power line as a communication line is available (see, e.g., Japanese Patent Application Publication No. 2012-110155 (JP 2012-110155 A)). The vehicle-mounted controller is mounted on a vehicle that includes a high-voltage battery, vehicle-mounted information equipment, a low-voltage battery, and a voltage converter. The high-voltage battery is charged by electric power supply from electric vehicle supply equipment (e.g., a charging station provided in a gas station or the like or a commercial power supply provided in a house) via a charging cable. In addition, the high-voltage battery supplies operation power to a motor that generates drive power. The vehicle-mounted information equipment performs communication, via the charging cable, with the electric vehicle supply equipment or an external information device connected to the electric vehicle supply equipment. The low-voltage battery supplies operation power to vehicle-mounted auxiliary machines including at least the vehicle-mounted information equipment. The voltage converter performs voltage conversion between the high-voltage battery and the low-voltage battery.

In the vehicle-mounted controller described above, when the voltage of the low-voltage battery becomes lower than a first threshold during the accessory-off state of the vehicle, the voltage converter is controlled such that the low-voltage battery is charged by electric power supply from the high-voltage battery. Thereafter, when the voltage of the low-voltage battery exceeds a second threshold, the operation of the voltage converter is stopped such that the charging of the low-voltage battery is stopped. Consequently, when the vehicle-mounted information equipment performs communication with the equipment or device outside the vehicle during the accessory-off state of the vehicle, it is possible to prevent the exhaustion of the low-voltage battery that supplies electric power required for the communication to the vehicle-mounted information equipment.

However, in the controller described in JP 2012-110155 A, it is necessary to provide a voltage sensor for detecting the battery voltage of the low-voltage battery in order to prevent the exhaustion of the low-voltage battery when the vehicle-mounted information equipment performs communication with the equipment outside the vehicle, and hence there is a possibility that the controller is increased in size.

SUMMARY OF THE INVENTION

The invention provides the vehicle-mounted controller that implements the prevention of exhaustion of the low-voltage battery that performs electric power supply to the vehicle-mounted information equipment with a simple configuration while allowing communication between the vehicle-mounted information equipment and the external equipment via the charging cable.

A first aspect of the invention is a vehicle-mounted controller mounted on a vehicle. The vehicle includes a high-voltage battery, vehicle-mounted information equipment, a low-voltage battery, and a voltage converter. The high-voltage battery is configured to be charged by electric power supply from external charging equipment via a charging cable and is configured to supply operation power to a motor configured to generate drive power. The vehicle-mounted information equipment is configured to perform communication, via the charging cable, with the external charging equipment or an external information device connected to the external charging equipment. The low-voltage battery is configured to supply the operation power to a vehicle-mounted auxiliary machine including at least the vehicle-mounted information equipment. The voltage converter is configured to perform voltage conversion between the high-voltage battery and the low-voltage battery. The vehicle-mounted controller includes a communication state determination unit and a battery charging control unit. The communication state determination unit is configured to determine whether or not the vehicle-mounted information equipment performs the communication with the external charging equipment or the external information device via the charging cable. The battery charging control unit is configured to control, in a case where the communication state determination unit determines that the vehicle-mounted information equipment performs the communication with the external charging equipment or the external information device via the charging cable, the voltage converter so as to charge the low-voltage battery by supplying electric power from the high-voltage battery to the low-voltage battery when a first specific time has elapsed since start of the communication.

According to the aspect of the invention, it is possible to implement the prevention of exhaustion of the low-voltage battery that performs electric power supply to the vehicle-mounted information equipment with a simple configuration while allowing the communication between the vehicle-mounted information equipment and the external equipment via the charging cable.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, a description will be given of a specific embodiment of a vehicle-mounted controller of the invention by using the drawings.

Figure 1:
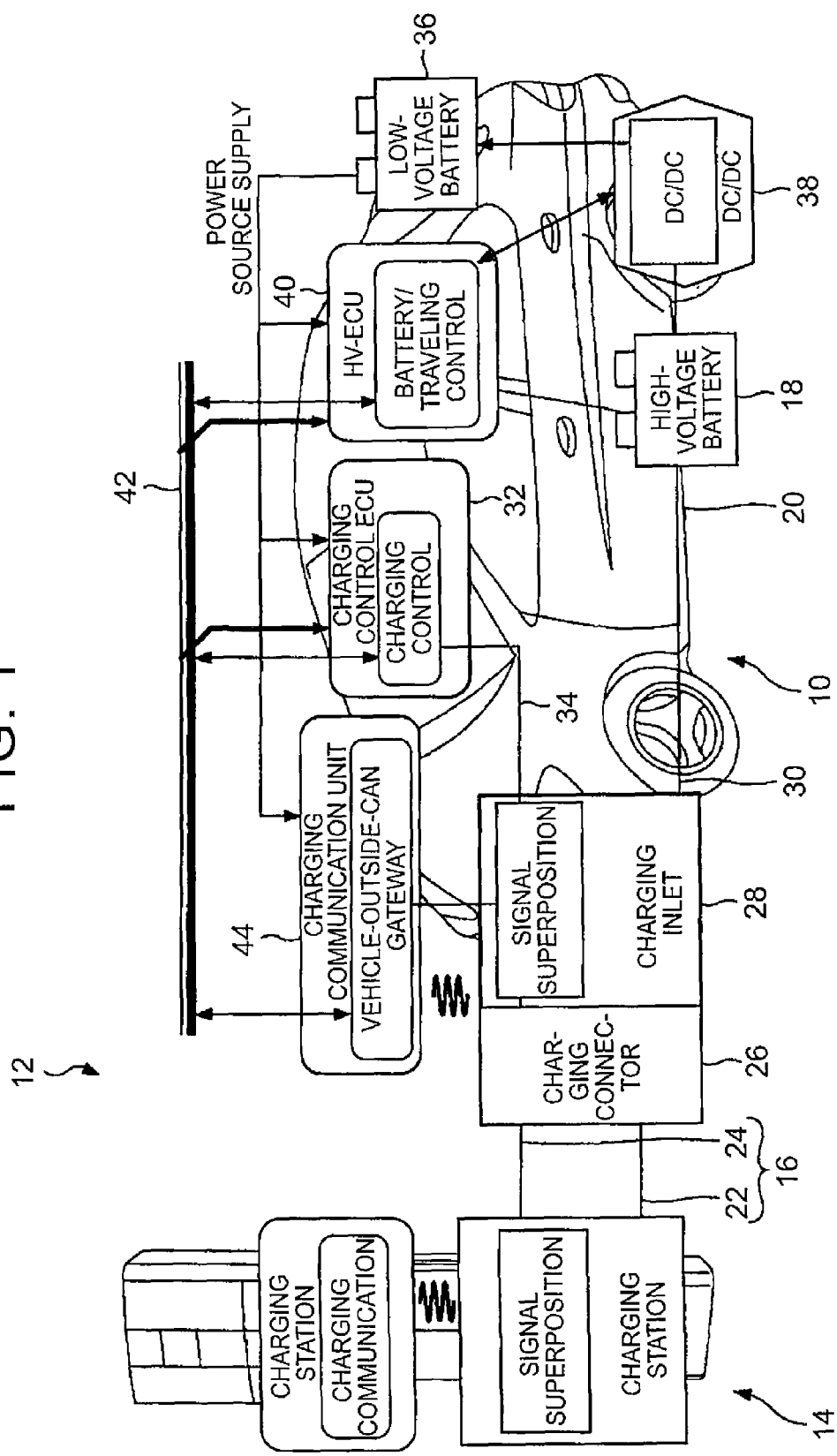
FIG. 1 is a configuration diagram of a charging communication system including a vehicle-mounted controller as an embodiment of the invention.

FIG. 1 shows a configuration diagram of a charging communication system 12 including a vehicle-mounted controller 10 as an embodiment of the invention. The charging communication system 12 of the embodiment includes the vehicle-mounted controller 10, electric vehicle supply equipment (EVSE) 14, i.e., external charging equipment, and a charging cable 16 for connecting the vehicle-mounted controller 10 and the EVSE 14.

The vehicle-mounted controller 10 is a controller that is mounted on a vehicle 20 having a high-voltage battery 18 capable of supplying operation power to a motor that generates drive power. The vehicle 20 may be a vehicle capable of electric traveling by using the motor as a drive power source such as, e.g., a plug-in vehicle, an electric vehicle, or a fuel cell vehicle. Note that the vehicle 20 is assumed to be a plug-in hybrid vehicle that is driven by power generated by the motor and power generated by a vehicle-mounted engine as an internal combustion engine.

The high-voltage battery 18 is a DC power source of a high voltage (e.g., 200 volts to 600 volts), and is a battery for driving the vehicle constituted by a rechargeable secondary battery such as, e.g., a nickel-metal hydride battery or a lithium ion battery. The high-voltage battery 18 can be charged by electric power supply from the EVSE 14 when the vehicle-mounted controller 10 and the EVSE 14 are connected to each other via the charging cable 16. In addition, even when the vehicle-mounted controller 10 and the EVSE 14 are not connected to each other via the charging cable 16, the high-voltage battery 18 can be charged by electric power generation of an alternator that generates electric power by the rotation of the vehicle-mounted engine and regeneration during deceleration of the vehicle.

The EVSE 14 may also be a charging station provided in a gas station, a convenience store, a service station, or an ordinary home. For example, the EVSE 14 is capable of supplying electric power to the high-voltage battery 18 of the vehicle 20 connected thereto via the charging cable 16 by using an external power supply (e.g., a commercial power supply; AC voltage of 100 volts to 200 volts) connected thereto via a receptacle. When the EVSE 14 supplies electric power to the high-voltage battery 18 of the vehicle 20 via the charging cable 16, the EVSE 14 is capable of transmission and reception of data exchanged between the control circuit of the EVSE 14 and the control circuit of the vehicle-mounted controller 10.

Note that examples of the data transmitted and received between the EVSE 14 and the vehicle-mounted controller 10 during the electric power supply from the EVSE 14 to the high-voltage battery 18 include data required to perform a charging process from the EVSE 14 to the vehicle-mounted controller 10, data on an input ID of a person who charges the high-voltage battery 18, and data on details of the charging from the EVSE 14 to the vehicle-mounted controller 10 indicative of a charging amount and a charging fee. Examples of the data required to perform the charging process include the availability of the electric power supply from the EVSE 14 to the vehicle-mounted controller 10 and the rated current of the EVSE 14.

To the EVSE 14, one end of the charging cable 16 is connected. The charging cable 16 is attached to the EVSE 14, and constitutes an electric vehicle supply device, i.e., external charging device, together with the EVSE 14 integrally. The charging cable 16 includes an electric power line 22 through which electric power from the EVSE 14 flows, and a signal line 24 through which the data exchanged between the EVSE 14 and the vehicle-mounted controller 10 flows. The EVSE 14 is capable of supplying electric power to be used to charge the high-voltage battery 18 to the vehicle-mounted controller 10 by using the electric power line 22 of the charging cable 16. In addition, the EVSE 14 is capable of transmitting data to be provided to the vehicle-mounted controller 10 to the vehicle-mounted controller 10 by using the signal line 24 of the charging cable 16.

Note that the data transmitted and received between the EVSE 14 and the vehicle-mounted controller 10 during the charging of the high-voltage battery 18 may be transmitted by using the electric power line 22 instead of or together with the signal line 24 (electric power line communication).

The other end of the charging cable 16 is provided with a charging connector 26 for connection to the vehicle-mounted controller 10. The charging connector 26 is a male connector that includes terminals for connection to the above-described electric power line 22 and the above-described signal line 24 included in the charging cable 16. The vehicle-mounted controller 10 includes a charging inlet 28 to which the charging connector 26 provided at the other end of the charging cable 16 can be connected. The charging inlet 28 is a female socket that includes a plurality of terminals corresponding to the above-described electric power line 22 and the above-described signal line 24 included in the charging cable 16.

The charging inlet 28 is provided, e.g., in the vicinity of a body portion where the high-voltage battery 18 is disposed (e.g., the rear portion, the side portion, or the front portion of the body). The power supply terminal of the charging inlet 28 and the high-voltage battery 18 are connected to each other via an electric power line 30. Electric power from the EVSE 14, the electric power having flown through the electric power line 22 of the charging cable 16, flows through the electric power line 30. The electric power from the EVSE 14 flows through the electric power line 30, and is also supplied to the high-voltage battery 18 after being converted to a DC voltage (e.g., 200 volts to 600 volts). The electric power from the EVSE 14, the electric power having flown through the electric power line 30, is supplied to the high-voltage battery 18 after being converted to the DC voltage, and the high-voltage battery 18 is thereby charged.

The vehicle-mounted controller 10 includes a charging control electronic control unit (charging control ECU) 32 constituted mainly by a microcomputer. The charging control ECU 32 is a unit that controls the charging of the above-described high-voltage battery 18 mounted on the vehicle 20. The signal terminal of the charging inlet 28 and the charging control ECU 32 are connected to each other via a signal line 34. When the high-voltage battery 18 is charged by the electric power supply from the EVSE 14 to the vehicle-mounted controller 10, the charging control ECU 32 generates data to be exchanged between the EVSE 14 and the vehicle-mounted controller 10 via the signal line 24 (hereinafter referred to as charging control data) and supplies the generated data to the signal line 34. In addition, the charging control ECU 32 receives the above-mentioned charging control data supplied from the side of the EVSE 14 via the signal line 34. Subsequently, based on the charging control data exchanged between the EVSE 14 and the vehicle-mounted controller 10 via the signal line 24, the charging control ECU 32 controls the charging of the high-voltage battery 18 by the electric power supply from the EVSE 14.

The vehicle 20 has a low-voltage battery 36 capable of supplying operation power to various auxiliary machines mounted on the vehicle 20. The low-voltage battery 36 is a DC power source of a low voltage (e.g., 12 volts) lower than the voltage of the high-voltage battery 18, and is a battery for auxiliary machines constituted by a rechargeable secondary battery such as, e.g., a nickel-metal hydride battery or a lithium ion battery. The low-voltage battery 36 can be charged by electric power generation of the alternator that generates electric power by the rotation of the vehicle-mounted engine and the regeneration during deceleration of the vehicle.

The high-voltage battery 18 and the low-voltage battery 36 are connected to each other via a DC-DC converter 38. The DC-DC converter 38 is equipment that performs voltage conversion between the high-voltage battery 18 and the low-voltage battery 36. The DC-DC converter 38 is operated when electric power supply is performed from the high-voltage battery 18 to the low-voltage battery 36 or when electric power supply is performed from the low-voltage battery 36 to the high-voltage battery 18. The low-voltage battery 36 can be charged by the electric power supply from the high-voltage battery 18.

To the DC-DC converter 38, a hybrid vehicle electronic control unit (HV-ECU) 40 is connected. The HV-ECU 40 is a unit that collectively controls the traveling of the vehicle 20 and the states of the batteries 18 and 36. The HV-ECU 40 allows the charging and discharging of each of the high-voltage battery 18 and the low-voltage battery 36, and the charging and discharging between the high-voltage battery 18 and the low-voltage battery 36. The HV-ECU 40 controls the DC-DC converter 38 such that the charging and discharging of each of the high-voltage battery 18 and the low-voltage battery 36 are properly performed. The DC-DC converter 38 operates according to the command from the HV-ECU 40.

Each of the charging control ECU 32 and the HV-ECU 40 is a unit configured to perform communication with the EVSE 14 via the signal line 24 of the charging cable 16 about the charging control data and another data different from the charging control data (hereinafter referred to as external communication data) during the charging of the high-voltage battery 18 by the electric power supply from the EVSE 14 to the high-voltage battery 18.

Note that the above-mentioned external communication data is data that can be exchanged not only during the charging of the high-voltage battery 18 but also during the ignition-off state of the vehicle 20. For example, the external communication data includes data indicative of the state of the vehicle 20 (e.g., the state of charge (SOC) of the high-voltage battery 18, the travel distance and the fuel-efficiency of the vehicle, the remaining amount of gasoline, the presence or absence of alarms, or ON or OFF of various lights), updated data for navigation, and music data for audio. In addition, the equipment with which the charging control ECU 32 and the HV-ECU 40 perform the communication of the external communication data via the signal line 24 of the charging cable 16 is not limited to the EVSE 14 itself. The equipment with which the charging control ECU 32 and the HV-ECU 40 perform the communication of the external communication data may also be an external information device (server) that uses the EVSE 14 as a gateway to be connected to the EVSE 14 via a network.

The charging control ECU 32 and the HV-ECU 40 are connected to each other via, e.g., an in-vehicle LAN 42 such as, e.g., CAN or the like, and are capable of exchanging information therebetween through the in-vehicle LAN 42. For example, the charging control ECU 32 determines whether or not the charging of the high-voltage battery 18 is performed by the electric power supply from the EVSE 14 to the high-voltage battery 18 via the electric power line 22 of the charging cable 16. On the other hand, information indicative of the determination result is supplied to the HV-ECU 40 from the charging control ECU 32 via the in-vehicle LAN 42. The HV-ECU 40 determines whether or not the high-voltage battery 18 is actually charged by the electric power supply from the EVSE 14 based on the information supplied from the charging control ECU 32 through the in-vehicle LAN 42.

To the in-vehicle LAN 42, a charging communication unit 44 is connected. The charging communication unit 44 is a unit that serves as a gateway for data to be exchanged between the charging control ECU 32 and the HV-ECU 40 connected to the in-vehicle LAN 42 and the EVSE 14. As shown in FIG. 1, the EVSE 14 is connected to the charging inlet 28 via the charging connector 26 and the signal line 24 of the charging cable 16. The charging communication unit 44 relays data supplied from the charging control ECU 32 or the HV-ECU 40 via the in-vehicle LAN 42, and supplies the data to the EVSE 14 via the signal line 24 of the charging cable 16. In addition, the charging communication unit 44 relays data supplied from the EVSE 14 via the signal line 24 of the charging cable 16, and supplies the data to the charging control ECU 32 or the HV-ECU 40 via the in-vehicle LAN 42.

The charging communication unit 44 also has the function of determining whether or not the communication of the external communication data is performed between the charging control ECU 32 or the HV-ECU 40 and the EVSE 14 (communication state determination function). The charging communication unit 44 determines whether or not the communication of the external communication data is performed between the charging control ECU 32 or the HV-ECU 40 and the EVSE 14, and data indicative of the result of the communication state determination is sent to the in-vehicle LAN 42 from the charging communication unit 44.

The HV-ECU 40 receives the data indicative of the result of the communication state determination sent from the charging communication unit 44 to the in-vehicle LAN 42. The HV-ECU 40 has the function of determining whether or not the communication of the external communication data is performed between the charging control ECU 32 or the HV-ECU 40 and the EVSE 14 during the ignition-off state of the vehicle 20 based on ignition information of the vehicle 20 and the data indicative of the result of the communication state determination sent from the charging communication unit 44 to the in-vehicle LAN 42.

The charging control ECU 32, the HV-ECU 40, and the charging communication unit 44 of the vehicle-mounted controller 10 are connected to the in-vehicle LAN 42 to perform the communication of the external communication data with the EVSE 14. The low-voltage battery 36 which serves as as the power source is connected to the charging control ECU 32, the HV-ECU 40, and the charging communication unit 44. The low-voltage battery 36 supplies electric power to the equipment 32, 40, and 44 in the vehicle-mounted controller 10 at any time including the time of the ignition-off state of the vehicle 20. The charging control ECU 32, the HV-ECU 40, and the charging communication unit 44 operate by the electric power supply from the low-voltage battery 36. Consequently, the charging control ECU 32, the HV-ECU 40, and the charging communication unit 44 can operate even during the ignition-off state of the vehicle 20.

Note that the equipment in the vehicle-mounted controller 10 that performs communication with the outside via the signal line 24 of the charging cable 16 is not limited to the charging control ECU 32 and the HV-ECU 40, and may be any equipment connected to the in-vehicle LAN 42.

Figure 2:
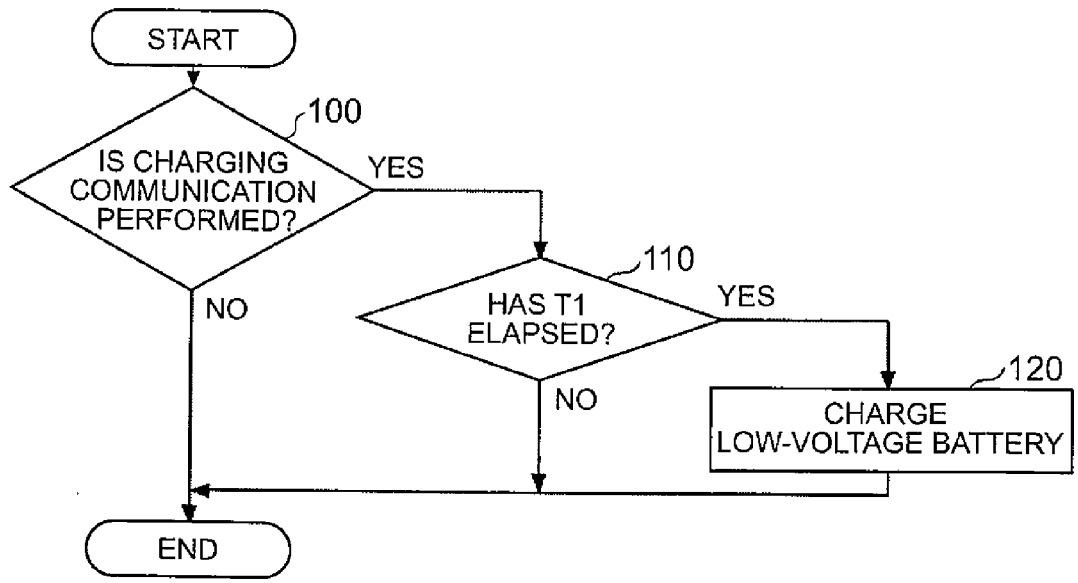
FIG. 2 is a flowchart of an example of a control routine executed in the vehicle-mounted controller of the embodiment.
Figure 3:
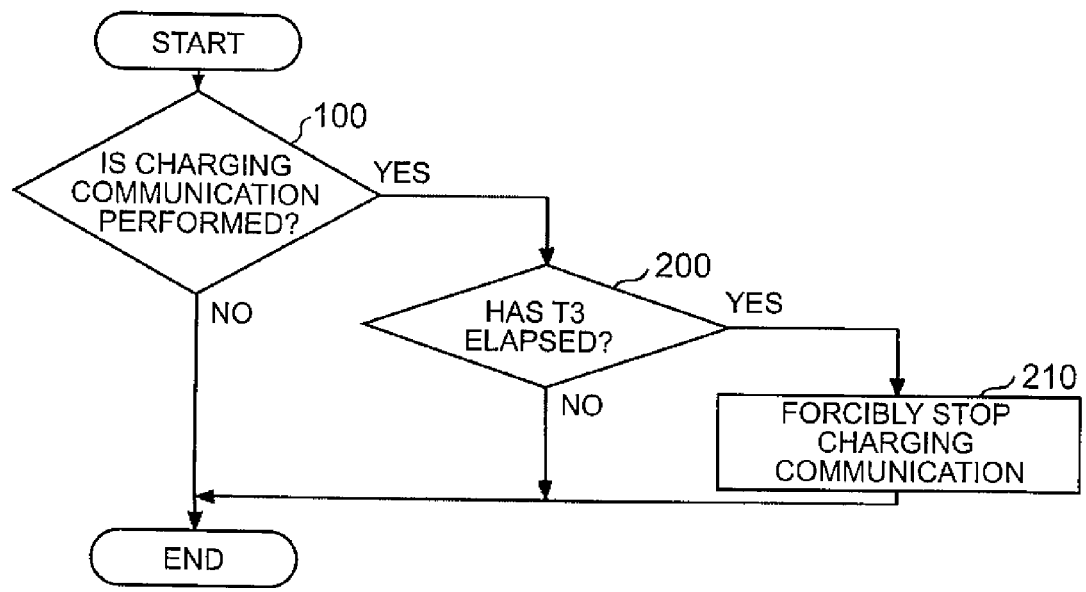
FIG. 3 is a flowchart of another example of the control routine executed in the vehicle-mounted controller of the embodiment.

Next, with reference to FIGS. 2 and 3, a description will be given of the operation of the charging communication system 12 including the vehicle-mounted controller 10 of the embodiment. FIG. 2 shows a flowchart of an example of a control routine executed in the vehicle-mounted controller 10 of the embodiment. Further, FIG. 3 shows a flowchart of another example of the control routine executed in the vehicle-mounted controller 10 of the embodiment.

In the embodiment, once the EVSE 14 is connected to the vehicle-mounted controller 10 via the charging cable 16, it is possible to perform the electric power supply to the high-voltage battery 18 from the EVSE 14 via the charging cable 16 thereafter, and hence it is possible to charge the high-voltage battery 18. When the high-voltage battery 18 is charged by the electric power supply from the EVSE 14 via the electric power line 22, the charging control data is exchanged between the EVSE 14 and the vehicle-mounted controller 10 via the signal line 24. The charging control ECU 32 of the vehicle-mounted controller 10 operates with electric power supplied from the low-voltage battery 36, and is capable of exchanging the charging control data with the EVSE 14 via the signal line 24.

In the situation where the vehicle-mounted controller 10 and the EVSE 14 are connected to each other via the charging cable 16, the ECUs 32 and 40 on the in-vehicle LAN 42 in the vehicle-mounted controller 10 operate with electric power supplied from the low-voltage battery 36, and are capable of performing the communication of the external communication data with the EVSE 14 via the signal line 24. Further, the charging communication unit 44 operates with the electric power supplied from the low-voltage battery 36, and determines whether or not the communication of the external communication data is performed between the charging control ECU 32 or the HV-ECU 40 on the in-vehicle LAN 42 and the EVSE 14 via the signal line 24 with the communication state determination function.

The charging communication unit 44 transmits the data indicative of the determination result by the communication state determination function to the HV-ECU 40 via the in-vehicle LAN 42. The HV-ECU 40 receives the data indicative of the result of the communication state determination sent to the in-vehicle LAN 42 from the charging communication unit 44. The HV-ECU 40 determines whether or not the communication of the external communication data is performed between the charging control ECU 32 or the HV-ECU 40 on the in-vehicle LAN 42 and the EVSE 14 during the ignition-off state of the vehicle 20 based on the ignition information of the vehicle 20 and the data indicative of the result of the communication state determination sent to the in-vehicle LAN 42 from the charging communication unit 44 (step S100).

As a result, in a case where the HV-ECU 40 determines that the communication of the external communication data is not performed between the charging control ECU 32 or the HV-ECU 40 on the in-vehicle LAN 42 and the EVSE 14 during the ignition-off state of the vehicle 20, the HV-ECU 40 ends the process without continuing the process thereafter. On the other hand, in a case where the HV-ECU 40 determines that the communication of the external communication data is performed between the charging control ECU 32 or the HV-ECU 40 on the in-vehicle LAN 42 and the EVSE 14 during the ignition-off state of the vehicle 20, the HV-ECU 40 then determines whether or not a first specific time T1 elapses since the start of the communication of the external communication data between the ECU 32 or 40 and the EVSE 14 during the ignition-off state (step S110).

Note that the above first specific time T1 is a continuation time of electric power supply with which the charged amount of the low-voltage battery 36, the low-voltage battery 36 performing the electric power supply to the ECUs 32 and 40 and the unit 44 on the in-vehicle LAN 42, is reduced by the execution of the above communication of the external communication data. The first specific time T1 is set to a predetermined time (e.g., 10 seconds or the like). In addition, the first specific time T1 may be variable according to the charged amount of the low-voltage battery 36 at the time point of start of the communication of the external communication data. For example, the first specific time T1 is set to be longer as the charged amount thereof is larger, and is set to be shorter as the charged amount thereof is smaller.

In a case where the HV-ECU 40 determines that the first specific time T1 has not elapsed since the start of the communication of the external communication data as the result of the process in step 110 described above, the HV-ECU 40 ends the process without continuing the process thereafter. On the other hand, in a case where the HV-ECU 40 determines that the first specific time T1 has elapsed since the start of the communication of the external communication data, the HV-ECU 40 controls the DC-DC converter 38 such that the electric power supply from the high-voltage battery 18 to the low-voltage battery 36 is performed and the charging of the low-voltage battery 36 is thereby performed (step 120).

When the communication of the external communication data between the ECU 32 or 40 and the EVSE 14 continues for a long time during the ignition-off state of the vehicle 20, the charged amount of the low-voltage battery 36 is reduced. The low-voltage battery 36 supplies electric power required for the above communication to the ECU 32 or 40 and the unit 44. To cope with this, in the vehicle-mounted controller 10 of the embodiment, when the communication of the external communication data continues for the first specific time, the electric power supply from the high-voltage battery 18 to the low-voltage battery 36 is performed, and the charging of the low-voltage battery 36 is thereby performed.

Consequently, in the embodiment, when the ECU 32 or 40 as the vehicle-mounted information equipment performs the communication of the external communication data with the EVSE 14 via the charging cable 16 during the ignition-off state of the vehicle 20, it is possible to prevent the exhaustion of the low-voltage battery 36. That is, even when the electric power of the low-voltage battery 36 that supplies the electric power to the ECU 32 or 40 during the ignition-off state of the vehicle 20 is consumed by the execution of the above-described communication, it is possible to prevent the exhaustion of the low-voltage battery 36.

In addition, in the configuration described above, the continuation time when the ECU 32 or 40 performs the communication of the external communication data with the EVSE 14 via the charging cable 16 is measured, and the exhaustion of the low-voltage battery 36 that supplies electric power to the ECU 32 or 40 during the ignition-off state of the vehicle 20 is prevented based on the result of the comparison between the measured continuation time and the first specific time T1 as the threshold time. That is, it is not necessary to detect the battery voltage as the voltage across the low-voltage battery 36 or provide a voltage sensor for detecting the battery voltage. Accordingly, an increase in the size of the vehicle-mounted controller 10 caused by preventing the exhaustion of the low-voltage battery 36 that supplies electric power to the ECU 32 or 40 during the ignition-off state of the vehicle 20 is avoided.

As described above, according to the embodiment, it is possible to implement the prevention of the exhaustion of the low-voltage battery 36 that supplies electric power to the ECUs 32 and 40 with a simple configuration while allowing the communication of the external communication data between the ECU 32 or 40 and the EVSE 14 during the ignition-off state of the vehicle 20.

In addition, in the embodiment, in the case where the first specific time T1 has elapsed since the start of the above communication of the external communication data between the ECU 32 or 40 and the EVSE 14 via the charging cable 16, the HV-ECU 40 starts the control of the DC-DC converter 38 such that the charging of the low-voltage battery 36 is performed by the electric power supply from the high-voltage battery 18. After the start of the control of the DC-DC converter 38, the HV-ECU 40 determines whether or not a condition for stopping the charging of the low-voltage battery 36 (charging stop condition) is satisfied.

Note that the charging stop condition is one or more of a condition that the communication of the external communication data between the ECU 32 or 40 and the EVSE 14 via the charging cable 16 is ended, a condition that a second specific time T2 elapses since the start of charging of the low-voltage battery 36, a condition that the charged amount of the low-voltage battery 36 exceeds a specific amount, and a condition that the charged amount of the high-voltage battery 18 becomes lower than a specific amount.

In a case where the HV-ECU 40 determines that the above charging stop condition is not satisfied, the HV-ECU 40 continues the control of the DC-DC converter 38 such that the charging of the low-voltage battery 36 is performed. On the other hand, in a case where the HV-ECU 40 determines that the above charging stop condition is satisfied, the HV-ECU 40 stops the operation of the DC-DC converter 38 such that the charging of the low-voltage battery 36 is stopped by stopping the electric power supply from the high-voltage battery 18 to the low-voltage battery 36.

Consequently, according to the embodiment, it is possible to prevent the long-time unnecessary continuation of the charging of the low-voltage battery 36 resulting from the execution of the communication of the external communication data between the ECU 32 or 40 and the EVSE 14 via the charging cable 16 during the ignition-off state of the vehicle 20, and it is therefore possible to properly perform the charging of the low-voltage battery 36.

Incidentally, in the embodiment described above, each of the charging control ECU 32 and the HV-ECU 40 serves as "vehicle-mounted information equipment" of the invention, each of the charging control ECU 32, the HV-ECU 40, and the charging communication unit 44 serves as a "vehicle-mounted auxiliary machine" of the invention, and the DC-DC converter 38 serves as a "voltage converter" of the invention. In addition, a "communication state determination unit" of the invention is achieved by the execution of the process of step 100 in the routine shown in FIG. 2 by the HV-ECU 40. Furthermore, a "battery charging control unit" of the invention is achieved by the execution of the process of steps 110 and 120.

Note that, in the embodiment described above, the DC-DC converter 38 is controlled such that, when the communication of the external communication data between the charging control ECU 32 or the HV-ECU 40 on the in-vehicle LAN 42 and the EVSE 14 during the ignition-off state of the vehicle 20 has continued for not less than the first specific time T1, the electric power supply from the high-voltage battery 18 to the low-voltage battery 36 is performed, and the charging of the low-voltage battery 36 is thereby performed. In addition to the embodiment described above, when the communication has continued for not less than a third specific time T3, the communication of the external communication data between the charging control ECU 32 or the HV-ECU 40 and the EVSE 14 may be forcibly stopped.

That is, as shown in FIG. 3, after the HV-ECU 40 determines that the communication of the external communication data is performed between the charging control ECU 32 or the HV-ECU 40 on the in-vehicle LAN 42 and the EVSE 14 during the ignition-off state of the vehicle 20 in step 100 described above, the HV-ECU 40 determines whether or not the third specific time T3 elapses since the start of the communication of the external data between the ECU 32 or 40 and the EVSE 14 during the ignition-off state (step 200). Subsequently, in a case where the HV-ECU 40 determines that the third specific time T3 has elapsed since the start of the communication of the external communication data, the HV-ECU 40 then issues a command to the charging control ECU 32 and the charging communication unit 44 on the in-vehicle LAN 42 such that the communication of the external communication data with the EVSE 14 via the charging cable 16 is forcibly stopped (step 210).

As described above, when the communication of the external communication data is executed, the high-voltage battery 18 may charge the low-voltage battery 36. The third specific time T3 mentioned above is a continuation time of electric power supply with which the charged amount of the high-voltage battery 18 that charges the low-voltage battery 36 is considered to be reduced to such an extent that the vehicle 20 cannot be driven. The third specific time T3 is set to a predetermined time (e.g., 120 minutes or the like). Further, the third specific time T3 may be variable according to the charged amount of the high-voltage battery 18 at the time point of start of the communication of the external communication data. For example, the third specific time T3 is set to be longer as the charged amount thereof is larger, and is set to be shorter as the charged amount thereof is smaller.

When the communication of the external communication data between the charging control ECU 32 or the HV-ECU 40 on the in-vehicle LAN 42 and the EVSE 14 during the ignition-off state of the vehicle 20 has continued for not less than the third specific time T3, if the communication is forcibly stopped, it is possible to stop the electric power supply from the low-voltage battery 36 to the ECU 32 or 40 and the unit 44 required by the execution of the communication. Consequently, according to such a modification, it is possible to prevent the inconvenience caused by the continuous execution of the communication of the external communication data between the charging control ECU 32 or the HV-ECU 40 on the in-vehicle LAN 42 and the EVSE 14 during the ignition-off state of the vehicle 20. Specifically, according to such a modification, it is possible to prevent the exhaustion of the low-voltage battery 36, and by extension the exhaustion of the high-voltage battery 18.

In the embodiment described above, the charging cable 16 that connects the EVSE 14 and the vehicle-mounted controller 10 is attached to the EVSE 14, and constitutes the electric vehicle supply device together with the EVSE 14 integrally. However, the invention is not limited thereto. The charging cable 16 may also be mounted on the vehicle, and the charging cable 16 may also be connected to the EVSE 14 during the charging of the vehicle-mounted battery using the EVSE 14.

What is claimed is:

1. A vehicle-mounted controller mounted on a vehicle,
wherein the vehicle includes a high-voltage battery, vehicle-mounted information equipment, a low-voltage battery, and a voltage converter,
the high-voltage battery is configured to be charged by electric power supply from external charging equipment via a charging cable and is configured to supply operation power to a motor configured to generate drive power,
the vehicle-mounted information equipment is configured to perform communication, via the charging cable, with the external charging equipment or an external information device connected to the external charging equipment, the low-voltage battery is configured to supply the operation power to a vehicle-mounted auxiliary machine including at least the vehicle-mounted information equipment, and the voltage converter is configured to perform voltage conversion between the high-voltage battery and the low-voltage battery, the vehicle-mounted controller comprising:

a communication state determination unit configured to determine whether or not the vehicle-mounted information equipment performs the communication with the external charging equipment or the external information device via the charging cable; and a battery charging control unit configured to control, in a case where the communication state determination unit determines that the vehicle-mounted information equipment performs the communication with the external charging equipment or the external information device via the charging cable, the voltage converter so as to charge the low-voltage battery by supplying electric power from the high-voltage battery to the low-voltage battery when a first specific time has elapsed since start of the communication.

2. The vehicle-mounted controller according to claim 1, wherein the battery charging control unit is configured to stop operation of the voltage converter when, after charging of the low-voltage battery is started by supplying the electric power from the high-voltage battery to the low-voltage battery, a specific condition for stopping the charging is satisfied.

3. The vehicle-mounted controller according to claim 2, wherein the specific condition is at least one of a condition that the communication between the vehicle-mounted information equipment and the external charging equipment or the external information device via the charging cable is ended, a condition that a second specific time elapses since the start of the charging of the low-voltage battery, a condition that a charged amount of the low-voltage battery exceeds a specific amount, and a condition that a charged amount of the high-voltage battery becomes lower than a specific amount.

4. The vehicle-mounted controller according to claim 1, further comprising a charging communication forcible stop unit configured to forcibly stop the communication in a case where the communication state determination unit determines that the vehicle-mounted information equipment performs the communication with the external charging equipment or the external information device via the charging cable when a third specific time longer than the first specific time has elapsed since start of the charging of the low-voltage battery performed by the electric power supply from the high-voltage battery to the low-voltage battery.

5. The vehicle-mounted controller according to claim 4, wherein the third specific time is set to be longer as a charged amount of the high-voltage battery at a time point when the vehicle-mounted information equipment starts the communication with the external charging equipment or the external information device via the charging cable is larger.

6. The vehicle-mounted controller according to claim 1, wherein:

the low-voltage battery is a battery charged by electric power generation of an alternator that generates electric power by operation of a vehicle-mounted engine or regeneration during deceleration of the vehicle; and the communication state determination unit is configured to determine whether or not the vehicle-mounted information equipment performs the communication with the external charging equipment or the external information device via the charging cable during an ignition-off state.

7. The vehicle-mounted controller according to claim 1, wherein the vehicle-mounted information equipment is configured to perform the communication, via the charging cable, with the external charging equipment or the external information device connected to the external charging equipment by using the operation power supplied from the low-voltage battery.

8. The vehicle-mounted controller according to claim 1, wherein the battery charging control unit does not perform the charging of the low-voltage battery in a case where the communication state determination unit determines that the vehicle-mounted information equipment does not perform the communication with the external charging equipment or the external information device via the charging cable, or in a case where the first specific time does not elapse since the start of the communication.

* * * * *